US008930002B2

(12) United States Patent
Kauko

(10) Patent No.: US 8,930,002 B2
(45) Date of Patent: Jan. 6, 2015

(54) MOBILE COMMUNICATION TERMINAL AND METHOD THEREFOR

(75) Inventor: Jarmo Kauko, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1674 days.

(21) Appl. No.: 11/548,443

(22) Filed: Oct. 11, 2006

(65) Prior Publication Data

US 2008/0089525 A1    Apr. 17, 2008

(51) Int. Cl.
G06F 17/00 (2006.01)
G06F 3/0481 (2013.01)
H04M 1/725 (2006.01)

(52) U.S. Cl.
CPC ...... *H04M 1/72583* (2013.01); *H04M 1/72558* (2013.01); *H04M 1/72544* (2013.01); *G06F 3/04817* (2013.01)
USPC .............................. 700/94; 715/716; 715/727

(58) Field of Classification Search
USPC ..................................... 700/94; 715/716, 727
See application file for complete search history.

(56) References Cited

U.S. PATENT DOCUMENTS

| | | | | |
|---|---|---|---|---|
| 3,720,005 | A * | 3/1973 | Roche ............................ | 434/310 |
| 5,881,101 | A * | 3/1999 | Furman et al. ................ | 375/217 |
| 5,940,078 | A * | 8/1999 | Nagarajayya et al. ........ | 715/859 |
| 5,969,719 | A * | 10/1999 | Tsujimoto ..................... | 715/727 |
| 6,140,565 | A * | 10/2000 | Yamauchi et al. ............. | 84/600 |
| 6,154,549 | A * | 11/2000 | Arnold et al. ................. | 381/104 |
| 6,263,075 | B1 * | 7/2001 | Fadavi-Ardekani et al. ......................... | 379/399.01 |
| 6,271,841 | B1 * | 8/2001 | Tsujimoto ..................... | 715/839 |
| 6,898,291 | B2 * | 5/2005 | Gibson ......................... | 381/119 |
| 7,050,869 | B1 * | 5/2006 | Katayama et al. ............. | 700/94 |
| 7,526,505 | B2 * | 4/2009 | Dideriksen et al. ................... | 1/1 |
| 7,610,553 | B1 * | 10/2009 | Jacklin et al. ................. | 715/727 |
| 2002/0029259 | A1 * | 3/2002 | Okada .......................... | 709/219 |
| 2002/0067661 | A1 * | 6/2002 | Huntress ....................... | 367/136 |
| 2003/0095669 | A1 * | 5/2003 | Belrose et al. ................. | 381/56 |
| 2004/0111171 | A1 * | 6/2004 | Jang et al. ..................... | 700/94 |
| 2004/0128137 | A1 * | 7/2004 | Bush et al. .................... | 704/275 |
| 2005/0063550 | A1 * | 3/2005 | Koiwa ............................ | 381/17 |
| 2005/0073574 | A1 * | 4/2005 | Krisbergh et al. ......... | 348/14.01 |
| 2005/0091578 | A1 * | 4/2005 | Madan et al. ................. | 715/512 |
| 2005/0138574 | A1 * | 6/2005 | Lin ............................... | 715/811 |
| 2006/0031776 | A1 * | 2/2006 | Glein et al. ................... | 715/779 |
| 2006/0156237 | A1 * | 7/2006 | Williams et al. ............. | 715/720 |
| 2007/0188502 | A1 * | 8/2007 | Bishop .......................... | 345/473 |
| 2008/0022208 | A1 * | 1/2008 | Morse .......................... | 715/727 |
| 2009/0307594 | A1 * | 12/2009 | Kosonen et al. ............. | 715/727 |

OTHER PUBLICATIONS

Winamp_eq; plugin_releases; Available at least Sep. 2006: exemplary of automatic themes in winamp.*

* cited by examiner

*Primary Examiner* — Paul McCord
(74) *Attorney, Agent, or Firm* — Ziegler IP Law Group, LLC

(57) ABSTRACT

A method for providing a user interface modified in accordance to audio data, a module including an audio feature extractor and a UI modifier, an apparatus and a computer readable medium. First, audio data is received. Thereafter, an audio feature is extracted from the received audio data. In accordance to the extracted audio feature, the appearance of one of a number of user interface components is modified, e.g. by superposing music visualization effects.

23 Claims, 4 Drawing Sheets

MOBILE COMMUNICATION TERMINAL AND METHOD THEREFOR

FIELD

The disclosed embodiments generally relate to a method for providing a user interface modified in accordance to audio data, as well as a module and an apparatus thereof.

BACKGROUND

Many mobile communication terminals of today includes a music player, most often a so-called MP3 player and/or radio receiver. A great advantage of having a music player included is that, instead of two separate units, only one single unit is needed for users asking for a mobile communication terminal as well as a music player.

By including a music player in a mobile communication terminal, some of the hardware of the mobile communication terminal may be used by the music player as well. For instance, the display may be used by the music player in order to show the title of the song being played, the key board may be used in order to control the music player, etc.

Although a number of hardware synergies may be achieved by running a music player on the same platform as a mobile communication terminal, there is a need to more closely connect the music player to the mobile communication terminal in order to increase the customer satisfaction.

SUMMARY

In view of the above, the disclosed embodiments aim to solve or at least reduce the problems discussed above. In more particular, an advantage of the disclosed embodiments is to provide a user interface which is modified in accordance to audio data.

Generally, the a method for providing a user interface modified in accordance to extracted audio features, and an associated module and apparatus according to the attached independent claims is provided.

In a first aspect, the disclosed embodiments are directed to a method for providing a user interface of an apparatus, said user interface comprising a number of user interface components, said method comprising receiving audio data, extracting at least one audio feature from said audio data, and modifying the appearance of at least one of said number of user interface components in accordance to said extracted audio feature.

An advantage of this is that the user interface of the apparatus is made more alive, which will increase the user satisfaction.

Another advantage is that the user interface may be used at the same time as music visualization effects are shown. This implies that the apparatus may be utilised as usually, although music visualization effects is being shown on the display.

Still another advantage is that the user interface of the apparatus will vary in accordance to the audio data generated by the music player. This implies that the music player and the other functions of the apparatus are perceived by the user as one apparatus, not as an apparatus which can, for instance, be transformed from a communication apparatus into a music player apparatus.

In the method according to the first aspect, the reception, the extraction and the modification may be repeated.

Further, in the method according to the first aspect, the user interface components may be 3-D rendered graphical objects.

An advantage of having 3-D rendered graphical objects is that a more sophisticated user interface may be utilised.

In the method according to the first aspect, the 3-D rendered graphical objects may be hardware accelerated.

An advantage of this is that the responsitivity of the 3-D graphical objects of the user interface may be increased, which means that the user interface is quicker.

In the method according to the first aspect, the audio visualization effects may be superposed upon the 3-D rendered graphical objects.

In the method according to the first aspect, the modification may comprise classifying said extracted audio feature into one of a plurality of predetermined feature representations, and modifying the appearance of at least one of said number of user interface components in accordance to said one predetermined feature representation.

By having a number of predetermined feature representations determined in advance, the extracted audio feature may be classified into one of these predetermined representations. This implies that the classification may be made quicker and less computational power is needed. This is an advantage.

In the method according to the first aspect, the modification of said user interface components may be made in accordance to one of a set of user interface (UI) modification themes.

A UI modification theme may comprise information of how the extracted audio feature(s) is to be presented in the UI. For instance, the extracted audio feature(s) may be presented as a histogram superposed on a 3-D rendered UI component, or the extracted audio feature(s) may be presented as a number of circles superposed on a 3-D rendered UI component.

An advantage of this is that the way in which the modification of the user interface components is made may easily be chosen by the user of the apparatus.

In the method according to the first aspect, the set of UI modification themes may be user configurable.

In the method according to the first aspect, at least a number of said UI components may be modified, wherein each of said number of UI components may be modified in accordance to each respectively assigned audio feature.

An advantage of this is that different user interface components may be modified differently. For example, a first user interface component may be modified according to base frequencies, and a second user interface component may be modified in accordance to treble frequencies.

In a second aspect, the disclosed embodiments are directed to a module comprising an audio feature extractor configured to receive a stream of audio data and to extract at least one feature of said stream of audio data, and a user interface modifier configured to determine user interface modification data based upon said extracted feature.

An advantage of this second aspect is that one or several of the user interface components may be modified in accordance to the audio data.

The module according to the second aspect may further comprise an audio detector configured to detect an audio activation signal and to activate said audio feature extractor or said user interface modifier upon detection.

An advantage of this is that the audio feature extractor and the user interface modifier may be in a low power mode until audio data is being generated. When, for example, audio data is being generated, an audio activation signal may be transmitted to the audio feature extractor or the UI modifier, and the power mode of the module may then be switched to a high power mode, or, in other words, working mode. Hence, the power efficiency of the module may be increased by having an audio detector present.

The module according to the second aspect may further comprise a memory arranged to hold user interface modification settings.

An advantage of having a memory arranged to hold user interface settings is that no memory capacity of the apparatus is used for holding the user interface settings. This implies that less changes of the apparatus, in which the module is comprised, are needed.

The module according to the second aspect may further comprise an audio feature classifier configured to classify said at least one feature into one of a set of predetermined feature representations.

An advantage of this is that the audio feature classifier can be a hardware module or a software module specialized in this kind of classification, which implies that less time and computational power are needed.

The module according to the second aspect may further comprise a memory arranged to hold predetermined feature representations.

In a third aspect, the disclosed embodiments are directed to an apparatus comprising a display configured to visualize a user interface comprising a number of user interface components, a music player configured to generate audio data, a module configured to determine user interface modification data, and a graphics engine configured to modify said user interface component in accordance to said determined user interface modification data.

An advantage of this third aspect is that one or several of the user interface components may be modified in accordance to the audio data.

In the apparatus according to the third aspect, an audio activation signal may be transmitted from said music player to said module.

An advantage of this is that the module may be in a low power mode until audio data is being generated. When audio data is being generated and the audio activation signal is transmitted to the module, the power mode of the module may then be switched to a high power mode, or, in other words, working mode. Hence, the power efficiency of the apparatus may be increased by sending an audio signal to the module.

In the apparatus according to the third aspect, the apparatus may be a mobile communication terminal.

In the apparatus according to the third aspect, the user interface components may be 3-D rendered objects.

An advantage of having 3-D rendered graphical objects is that a more sophisticated user interface may be utilised.

In the apparatus according to the third aspect, the audio visualization effects may be superposed onto said user interface components.

In a fourth aspect, the disclosed embodiments are directed to a computer-readable medium having computer-executable components comprising instructions for receiving audio data, extracting at least one audio feature from said audio data, and modifying the appearance of at least one of said number of user interface components in accordance to said extracted audio feature.

In the computer-readable medium according to the fourth aspect, the reception, the extraction and the modification may be repeated.

In the computer-readable medium according to the fourth aspect, the user interface components may be 3-D rendered graphical objects.

In the computer-readable medium according to the fourth aspect, the modification may comprise classifying said found audio feature into a predetermined feature representation, and modifying the appearance of at least one of said number of user interface components in accordance to said predetermined feature representation.

Other features and advantages of the disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the disclosed embodiments, will be better understood through the following illustrative and non-limiting detailed description of preferred embodiments, with reference to the appended drawings, where the same reference numerals will be used for similar elements, wherein.

DETAILED DESCRIPTION OF PREFERRED EMBODIMENTS

Figure 1:
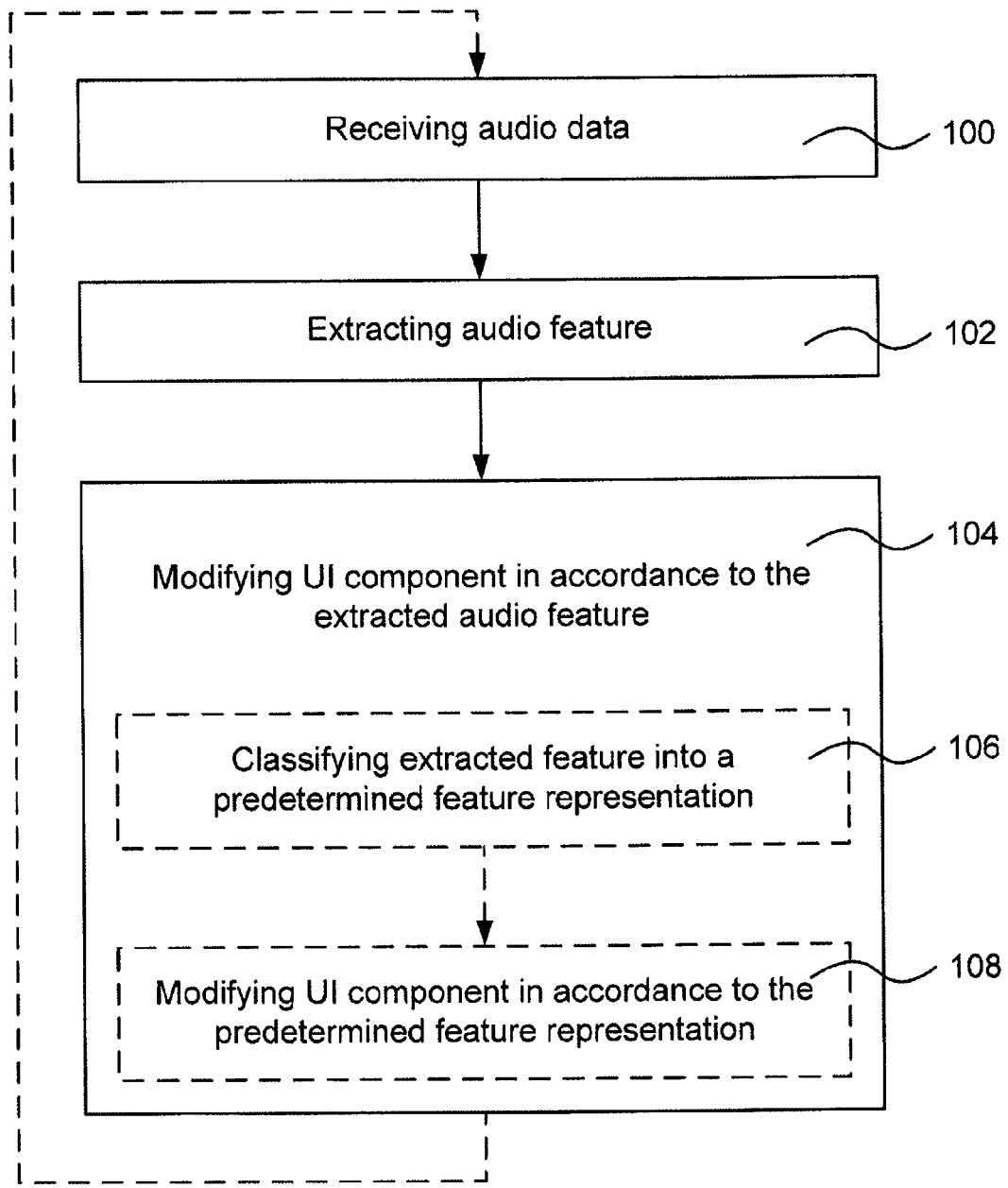
FIG. 1 is a flow chart of an embodiment of a method for modifying a user interface component in accordance to audio data.

FIG. 1 is a flow chart illustrating a method according to the disclosed embodiments describing the general steps of modifying a user interface component in accordance to audio data.

In a first step, 100, audio data is received. The audio data may be a current part of a stored audio file being played by a music player, or, alternatively, a current part of an audio stream received by an audio data receiver.

Next, in a second step, 102, an audio feature is extracted from the received audio data. Such an audio feature may be a frequency spectrum of the audio data.

Finally, in a third step, 104, one or several user interface components are modified in accordance to the extracted audio feature.

The third step, 104, may be subdivided into a first substep, 106, in which the extracted audio feature is classified into a predetermined feature representation. Thereafter, in a second substep, 108, the user interface component is modified in accordance to the predetermined feature representation.

By using predetermined feature representations, a number of user interface component appearance state images may be used. This implies that less computational power is needed in order to modify the user interface components in accordance to the audio data.

The user interface components can be 3-D rendered objects. Additionally, audio visualization effects can be superposed upon the 3-D rendered objects. Then, when receiving audio data and extracting an audio feature, the audio visualization effects are changed, which means that the appearance of the user interface components vary in accordance to the audio data.

Alternatively, 2-D objects may be used as user interface components. As in the case of 3-D rendered objects, audio visualization effects, which varies in accordance to the audio data, may be superposed upon the 2-D objects.

Alternatively, instead of having superposed audio visualization effects, the size of one or several user interface components may be modified in accordance to the extracted audio features. For instance, the user interface components may be configured to change size in accordance to the amount of base frequencies in the audio data. In this way, during a drum solo the size of the user interface component will be large, and during a guitar solo the size will be small. Other options are that the colour, the orientation, the shape, the animation speed or other animation-specific attributes, such as zooming level in fractal animation, of the user interface components change in accordance to the audio data.

If so-called environment mapping is utilised, existing solutions for music visualization may be used. This is an advantage since no new algorithms must be developed. Another advantage of using so-called environment mapping is that a dynamically changing environment map emphasizes the shape of a 3-D object, making UI components easier to recognize.

Optionally, different user interface components may be associated to different frequencies. For instance, when playing a rock song comprising several different frequencies, a first user interface component, such as a "messages" icon, may change in accordance to high frequencies, i.e. treble frequencies, and a second user interface component, such as "contacts" icon, may change in accordance to low frequencies, i.e. base frequencies.

The procedure of receiving audio data, 100, extracting audio feature, 102, and modifying a UI component in accordance to the extracted audio feature, 104, may be repeated continuously as long as audio data is received. The procedure may, for instance, be repeated once every time the display is updated.

Figure 2:
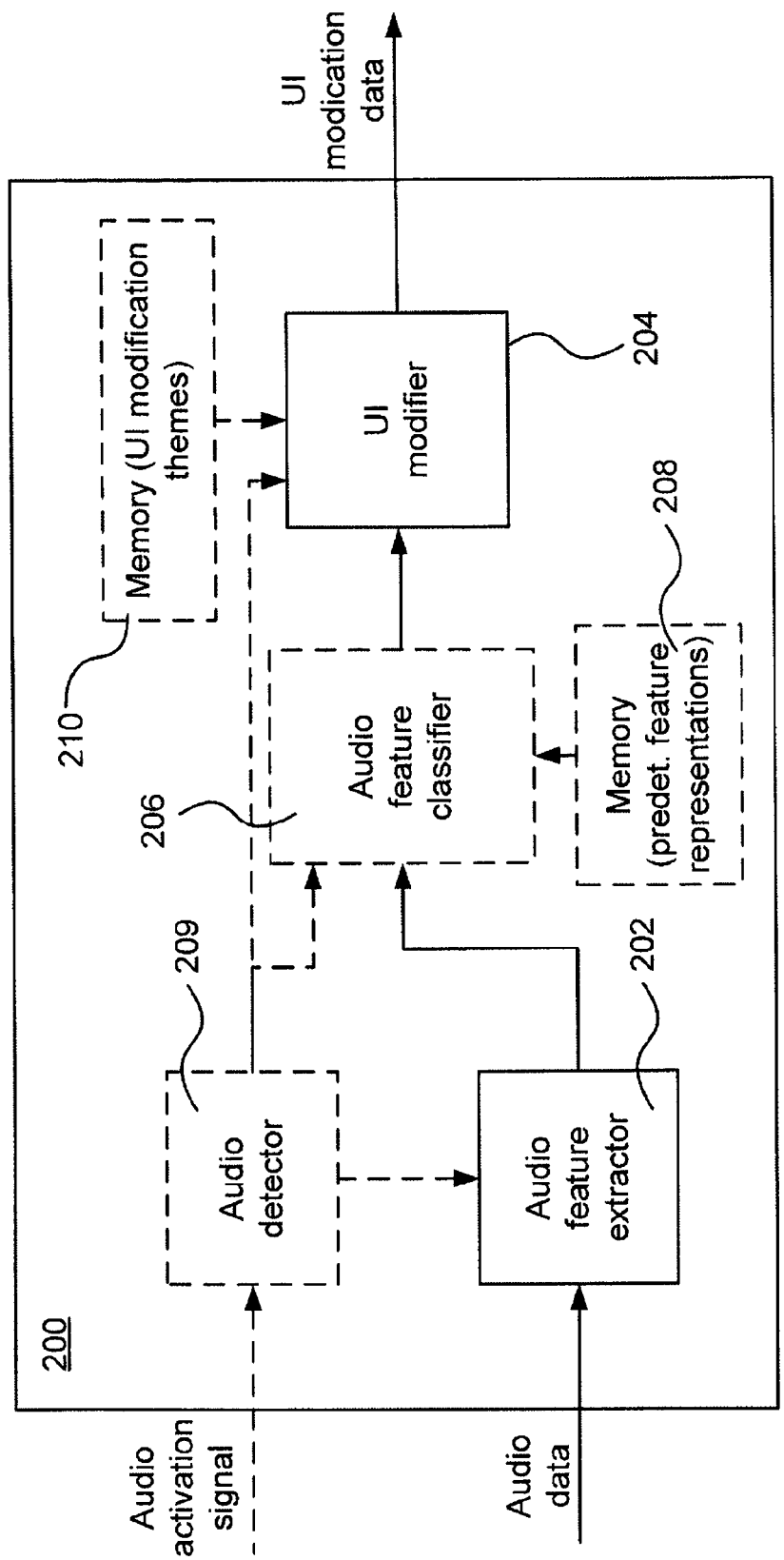
FIG. 2 schematically illustrates a module according to the disclosed embodiments.

FIG. 2 schematically illustrates a module 200. The module 200 may be a software implemented module or a hardware implemented module, such as an ASIC, or a combination thereof, such as an FPGA circuit.

Audio data can be input to an audio feature extractor 202. Thereafter, one or several audio features can be extracted from the audio data, and then the extracted features can be transmitted to a user interface (UI) modifier 204. UI modification data can be generated in the UI modifier 204 based upon the extracted audio feature(s). After having generated UI modification data, this data can be output from the module 200.

The UI modification data may be data representing the extracted audio feature(s). Then, a graphics engine (not shown) is configured to receive the UI modification data, and based upon this UI modification data and original graphics data, the graphic engine is configured to determine graphics data comprising audio visualization effects.

Alternatively, the UI modification data may be complete graphics data containing audio visualization effects. In other words, the graphics engine may be contained within said module 200.

Optionally, the module may further comprise an audio feature classifier 206. The function of the audio feature classifier 206 can be to find characteristic features of the audio signal. Such a characteristic feature may be the amount of audio data corresponding to a certain frequency, such as a base frequency or a treble frequency. Alternatively, if different UI components are corresponding to different characteristic features, a number of characteristic features may be determined in the audio feature classifier 206.

If an audio feature classifier 206 is present, a memory 208 comprising a number of predetermined feature representations may be present as well. A predetermined feature representation may, for instance, be the amount of audio data corresponding to a sound between 20 Hz and 100 Hz. The number of predetermined feature representations, i.e. the resolution of the classification, may be user configurable, as well as the limits of each of the predetermined feature representations.

Optionally, the module 200 may comprise an audio detector 209 configured to receive an audio activation signal. The audio activation signal may be transmitted from the music player when the playing of a song is started, or, alternatively, when the radio is switched on. When the audio detection signal is received, an audio activation signal is transmitted to the audio feature extractor 202, the UI modifier 204 or the audio feature classifier 206.

Optionally, the module 200 may further comprise a memory 210 containing UI modification themes. A UI modification theme may comprise information of how the extracted audio feature(s) is to be presented in the UI. For instance, the extracted audio feature(s) may be presented as a histogram superposed on a 3-D rendered UI component, or the extracted audio feature(s) may be presented as a number of circles superposed on a 3-D rendered UI component.

Figure 3:
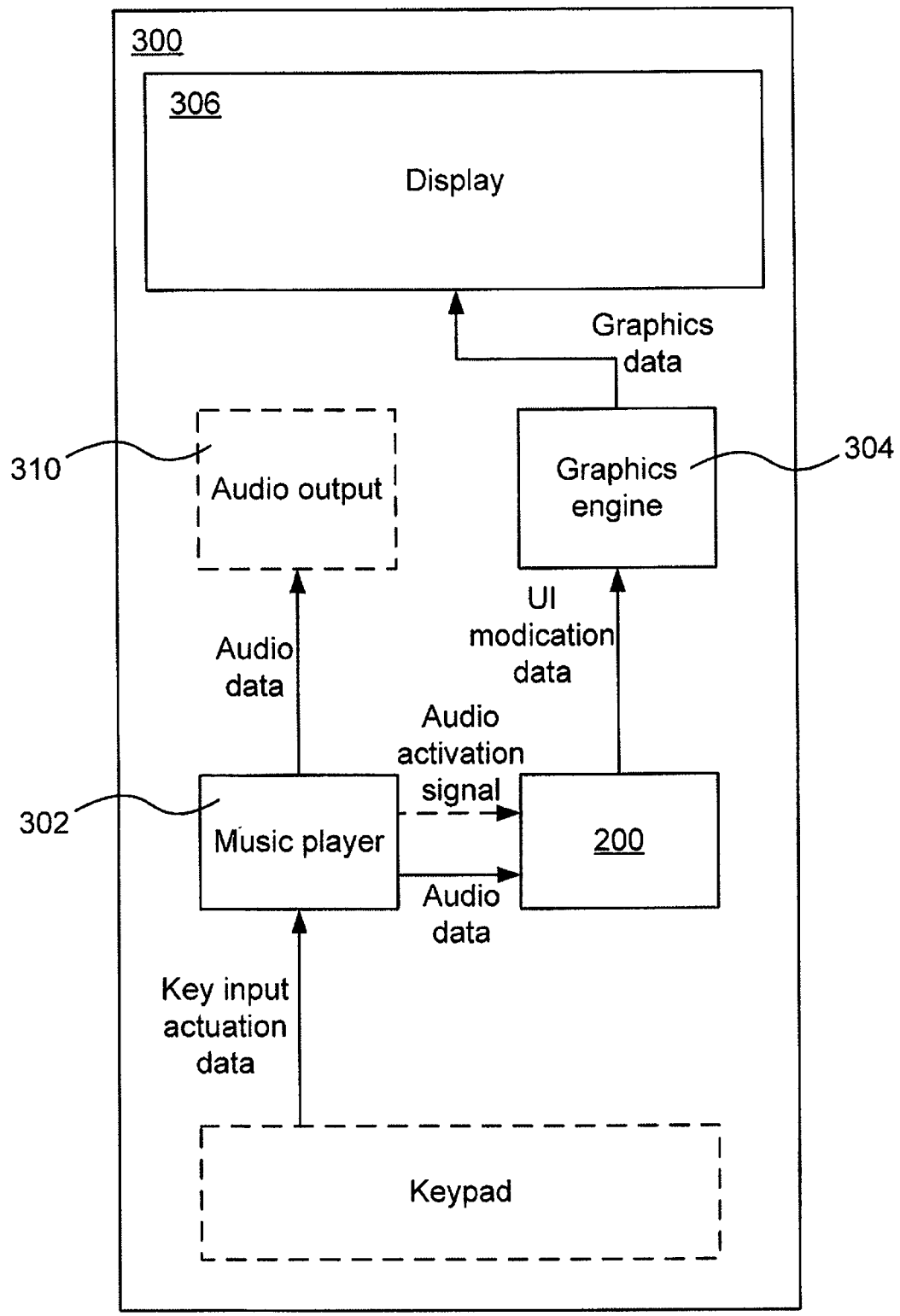
FIG. 3 schematically illustrates an apparatus according to the disclosed embodiments.

FIG. 3 schematically illustrates an apparatus 300, such as a mobile communication terminal, comprising the module 200, a music player 302, a graphics engine 304, a display 306, optionally a keypad 308 and optionally an audio output 310, such as a loudspeaker or a head phone output.

When a song is started in the music player 302, which start may be made after having received key input actuation data from the keypad 308, audio data and, optionally, an audio activation signal, are transmitted from the music player 302 to the module 200. Optionally, audio data may also be transmitted to the audio output 310.

The module 200 is configured to generate UI modification data from extracted audio features of the audio data as is described above. The UI modification data generated by the module 200 can be transmitted to the graphics engine 304. The graphics engine 304 can, in turn, be configured to generate graphics data presenting the extracted features of the audio data by using the UI modification data.

After having determined the graphics data, this data may be transmitted to the display 306, where it is shown to the user of the apparatus 300. Alternatively, if the graphics engine 304 is comprised within the module 200, graphics data is transmitted directly from the module 200 to the display 306.

Figure 4:
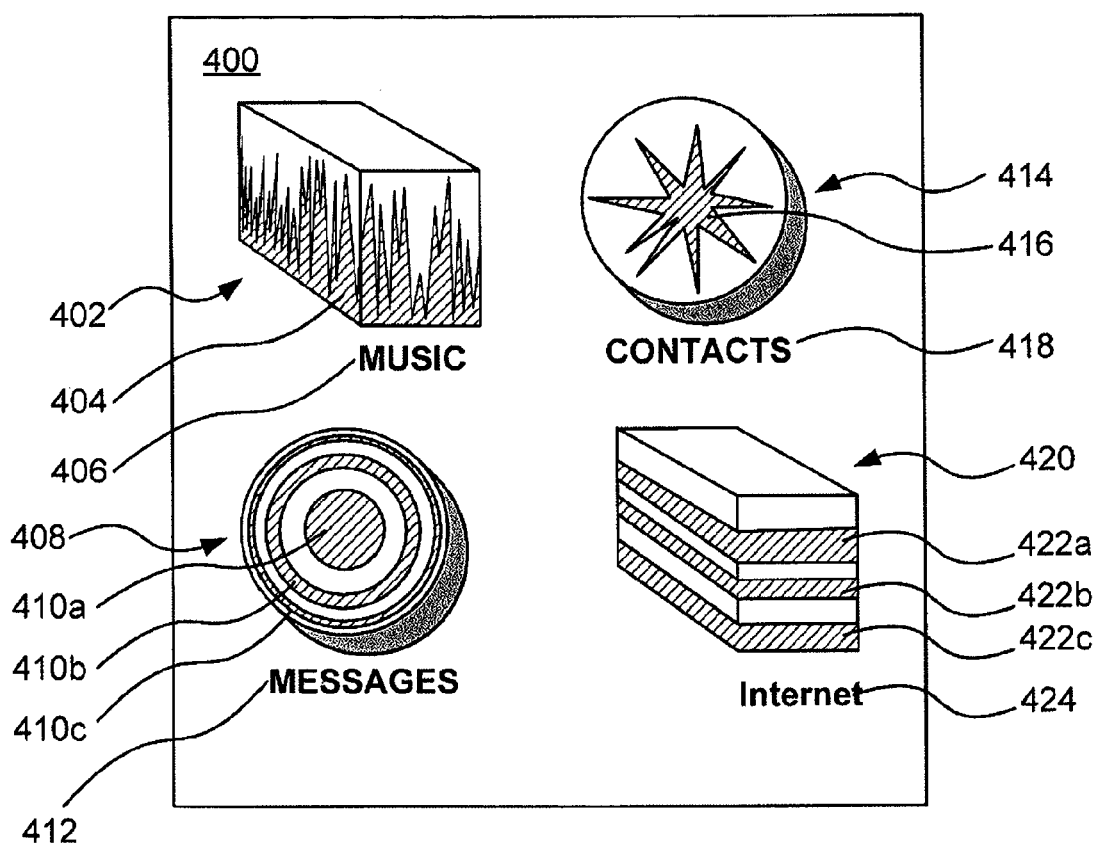
FIG. 4 illustrates an example of a user interface with user interface components being modified in accordance to audio data.

FIG. 4 illustrates an example of a user interface 400 with user interface components being modified in accordance to audio data.

A first user interface component may be illustrated as a "music" icon comprising a 3-D cuboid 402. Audio visualization effects in the form of a frequency diagram 404 can be superposed on the sides of the 3-D cuboid 402. Moreover, an identifying text "MUSIC" 406 may be available in connection to the 3-D cuboid 402.

A second user interface component illustrates a "messages" icon comprising a 3-D cylinder 408. Audio visualization effects in the form of a number of rings 410a, 410b, 410c may be superposed on the top of the 3-D cylinder 408. Moreover, an identifying text "MESSAGES" 412 may be available in connection to the 3-D cylinder 408.

A third user interface component illustrates a "contacts" icon comprising a 3-D cylinder 414. Audio visualization effects in the form of a 2-D frequency representation 416 may be superposed on the top of the 3-D cylinder 414. Moreover, an identifying text "CONTACTS" 418 may be available in connection to the 3-D cylinder 414.

A fourth user interface component illustrates an "Internet" icon comprising a 3-D cuboid 420. Audio visualization effects in the form of a number of stripes 422a, 422b, 422c may be superposed on the sides of the 3-D cuboid 420. Moreover, an identifying text "Internet" 424 may be available in connection to the 3-D cuboid 420.

The invention has mainly been described above with reference to a few embodiments. However, as is readily appreciated by a person skilled in the art, other embodiments than the ones disclosed above are equally possible within the scope of the invention, as defined by the appended patent claims.

We hereby claim:

1. A method for providing a user interface of a communication apparatus, said method comprising switching form a low power mode to a working mode upon receiving a stream of audio data; and upon switching from the low power mode to the working mode;
    extracting at least one audio feature from said stream of audio data, and
    modifying the appearance of at least one user interface components configured for invoking a function of the communication apparatus, in accordance with said extracted audio feature.

2. The method according to claim 1, wherein said reception, said extraction and said modification are repeated.

3. The method according to claim 1, wherein said user interface components are 3-D rendered graphical objects.

4. The method according to claim 3, wherein said 3-D rendered graphical objects are hardware accelerated.

5. The method according to claim 3, wherein audio visualization effects are superposed upon said 3-D rendered graphical objects.

6. The method according to claim 1, wherein said modification comprises
    classifying said extracted audio feature into one of a plurality of predetermined feature representations, and
    modifying the appearance of the at least one user interface components in accordance with said one predetermined feature representation.

7. The method according to claim 1, wherein said user interface component is modified in accordance with one of a set of user interface modification themes.

8. The method according to claim 7, wherein said set of user interface modification themes are user configurable.

9. The method according to claim 1, wherein at least one user interface component comprises a plurality of user interface components, and wherein each of said plurality of user interface components is modified in accordance with a respectively assigned audio feature.

10. A module implemented in hardware comprising:
    an audio feature extractor configured to receive a stream of audio data and to extract at least one feature of said stream of audio data,
    a user interface modifier configured to determine user interface modification data based upon said extracted feature for modifying a user interface component configured to invoke a communication apparatus function, and
    an audio detector configured to provide an audio activation signal upon detecting the stream of audio data, wherein the audio feature extractor and the user interface modifier are further configured to switch from a low power made to a working mode upon receiving the audio activation signal.

11. The module according to claim 10, further comprising a memory arranged to hold user interface modification settings.

12. The module according to claim 10, further comprising an audio feature classifier configured to classify said at least one feature into one of a set of predetermined feature representations.

13. The module according to claim 12, further comprising a memory arranged to hold predetermined feature representations.

14. An communication apparatus comprising
    a display configured to visualize a user interface comprising at least one user interface components configured for invoking a function of the communication apparatus,
    a music player configured to generate a steam of audio data,
    a module configured to determine user interface modification data, and
    a graphics engine configured to modify said at least one user interface component in accordance with said determined user interface modification data; and
    an audio detector configured to provide an audio activation signal upon detecting the stream of audio data, wherein the module and graphics engine are further configured to switch from a low power mode to a working mode upon receiving the audio activation signal.

15. The apparatus according to claim 14, wherein said apparatus is a mobile communication terminal.

16. The apparatus according to claim 14, wherein said at least one user interface component comprises a 3-D rendered objects.

17. The apparatus according to claim 14, wherein audio visualization effects are superposed onto said at least one user interface components.

18. A non-transitory computer-readable medium having computer-executable components comprising instructions for:
    switching from a low power mode to a working mode upon receiving a stream of audio data; and
    upon switching from the low power mode to the working mode:
    extracting at least one audio feature from said stream of audio data, and
    modifying the appearance of at least one user interface components configured for invoking a function of a communication apparatus in accordance with said extracted audio feature.

19. The non-transitory computer-readable medium according to claim 18, wherein said reception, said extraction and said modification are repeated.

20. The non-transitory computer-readable medium according to claim 18, wherein said at least one user interface component comprises a 3-D rendered graphical object.

21. The non-transitory computer-readable medium according to claim 18, wherein said modification comprises
    classifying said extracted audio feature into a predetermined feature representation, and
    modifying the appearance of at least one of said number of user interface components in accordance with said predetermined feature representation.

22. The method of claim 1, wherein the at least one user interface component is configured for invoking a function of the communication apparatus when a user interacts with the at least one user interface component.

23. The method of claim 1, wherein the at least one user interface component configured for invoking a function of the communication apparatus comprises one or more of a music, messages, contacts, or Internet icon.

\* \* \* \* \*